(12) United States Patent
Sofke et al.

(10) Patent No.: US 12,135,271 B2
(45) Date of Patent: Nov. 5, 2024

(54) SENSOR DEVICE AND PARTICULATE MATTER SENSOR

(71) Applicants: Robert Bosch GmbH, Stuttgart (DE); TRUMPF Photonic Components GmbH, Ulm (DE)

(72) Inventors: Soeren Sofke, Tübingen (DE); Tarek Zaki, Munich (DE)

(73) Assignees: Robert Bosch GmbH, Stuttgart (DE); TRUMPF Photonic Components GmbH, Ulm (DE)

( * ) Notice: Subject to any disclaimer, the term of this patent is extended or adjusted under 35 U.S.C. 154(b) by 323 days.

(21) Appl. No.: 17/485,112

(22) Filed: Sep. 24, 2021

(65) Prior Publication Data

US 2022/0120663 A1   Apr. 21, 2022

(30) Foreign Application Priority Data

Oct. 16, 2020 (DE) ..................... 10 2020 127 377.0

(51) Int. Cl.
*G01N 15/1429* (2024.01)
*G01N 15/14* (2024.01)

(52) U.S. Cl.
CPC ..... *G01N 15/1429* (2013.01); *G01N 15/1425* (2013.01); *G01N 2015/1486* (2013.01)

(58) Field of Classification Search
None
See application file for complete search history.

(56) References Cited

U.S. PATENT DOCUMENTS

2002/0081744 A1* 6/2002 Chan ................. B01L 3/502761
                                                      436/164
2009/0287356 A1* 11/2009 Dunne ............. G01N 35/00613
                                                      700/282

(Continued)

FOREIGN PATENT DOCUMENTS

DE   102018213932 A1   2/2020
DE   102018215177 A1   3/2020

(Continued)

OTHER PUBLICATIONS

German Office Action and Search Report on the Patentability of Application No. DE 10 2020127377, Mailed Jun. 29, 2021, 15 pages.

*Primary Examiner* — Rufus L Phillips
(74) *Attorney, Agent, or Firm* — Womble Bond Dickinson (US) LLP (57) ABSTRACT

The invention is based on a sensor device (10) with at least one sensor unit (12) comprising at least one laser unit (14) for a generation of at least one laser beam (16) and comprising at least one detection unit (18) for a detection of, in particular reflected, laser beams (20), with an evaluation unit (22) which is configured to process detected laser beams (20) into at least one sensor signal (39), and with a control unit (26) which is configured, in a continuous operation state, to actuate the sensor unit (12) and the evaluation unit (22) for an operation of the sensor unit (12) and the evaluation unit (22) in alternating switch-on intervals (31, 43) and switch-off intervals (33, 45).
It is proposed that the evaluation unit (22) is configured to generate the at least one sensor signal (39) from at least two different switch-on intervals (31) of the sensor unit (12).

4 Claims, 6 Drawing Sheets

(56) References Cited

U.S. PATENT DOCUMENTS

| | | | |
|---|---|---|---|
| 2018/0209779 A1* | 7/2018 | Van Der Lee | G01N 15/06 |
| 2018/0246026 A1* | 8/2018 | Cai | G01N 15/1456 |
| 2020/0056981 A1 | 2/2020 | Van Der Lee et al. | |
| 2020/0129100 A1* | 4/2020 | Li | G01N 21/64 |
| 2020/0132582 A1 | 4/2020 | Weiss et al. | |
| 2020/0173904 A1 | 6/2020 | Wolf et al. | |
| 2021/0325292 A1* | 10/2021 | Wu | G01N 15/1459 |
| 2022/0146401 A1* | 5/2022 | Yamamoto | G01N 15/1429 |

FOREIGN PATENT DOCUMENTS

| | | | | |
|---|---|---|---|---|
| DE | 102018218378 A1 | 4/2020 | | |
| DE | 102018220600 A1 | 6/2020 | | |
| WO | WO-2014158013 A1 * | 10/2014 | | G01N 15/0205 |
| WO | 2017198699 A1 | 11/2017 | | |

* cited by examiner

SENSOR DEVICE AND PARTICULATE MATTER SENSOR

STATE OF THE ART

A sensor device has already been proposed, with at least one sensor unit comprising at least one laser unit for a generation of at least one laser beam and comprising at least one detection unit for a detection of, in particular reflected, laser beams, with an evaluation unit which is configured to process detected laser beams into at least one sensor signal, and with a control unit which is configured to actuate the sensor unit and the evaluation unit for an operation of the sensor unit and the evaluation unit in alternating switch-on intervals and switch-off intervals in a continuous operation state.

DISCLOSURE OF THE INVENTION

The invention is based on a sensor device with at least one sensor unit comprising at least one laser unit for a generation of at least one laser beam and comprising at least one detection unit for a detection of, in particular reflected, laser beams, with an evaluation unit which is configured to process detected laser beams into at least one sensor signal, and with a control unit which is configured, in a continuous operation state, to actuate the sensor unit and the evaluation unit for an operation of the sensor unit and the evaluation unit in alternating switch-on intervals and switch-off intervals.

It is proposed that the evaluation unit is configured to generate the at least one sensor signal from at least two different switch-on intervals of the sensor unit.

Preferably the sensor device is implemented as an optical sensor device, in particular for capturing electromagnetic radiation and in particular for outputting sensor signals, correlating for example with a quantity of detected electromagnetic radiation, to a direction of detected electromagnetic radiation, to a wavelength of detected electromagnetic radiation and/or to a phase of detected electromagnetic radiation. The sensor device may in particular be implemented as an actor device, which may in particular be configured to derive an actor function from the sensor signal and to execute said actor function. "Configured" is in particular to mean specifically programmed, designed and/or equipped. By an object being configured for a certain function is in particular to be understood that the object fulfills and/or executes said certain function in at least one application state and/or operation state, in particular a continuous operation state. Preferably, in the continuous operation state, the sensor device generates at least one laser beam, captures at least portions of at least one laser beam and outputs a sensor signal depending on the at least one captured portion of the at least one laser beam.

Preferably the laser unit comprises at least one laser element for a generation of the at least one laser beam. Preferably the at least one laser element is embodied as an edge emitter. Preferably the at least one laser element is embodied as a vertical-cavity edge emitter The at least one detection unit may be configured for a detection of transmitted laser beams. Preferably the at least one detection unit comprises at least one detection element for a detection of, preferentially reflected, laser beams, in particular of, preferentially reflected, laser beams generated by the at least one laser unit, in particular by the at least one laser element. Preferably the at least one detection element is embodied as a photodetector. Preferably the at least one detection element is embodied as at least one photodiode, in particular as at least one photodiode array. Preferably the at least one laser unit and the at least one detection unit are implemented as a structural-component unit. Preferably the at least one laser element is connected to the at least one detection element. In particular, the at least one detection element may be implemented such that it is integrated in the at least one laser unit. For example, the at least one laser element and the at least one detection element may be implemented as a structural-component unit, in particular as a vertical-cavity edge emitter with integrated photodiode. Preferably the sensor unit comprises at least one storage element.

Preferably the at least one evaluation unit comprises at least one evaluation element, which is configured to process the detected laser beams into at least one sensor signal. Preferably the at least one evaluation element is implemented as an application-specific integrated switch element, preferably ASIC element, in particular as an integrated circuit. Preferably the evaluation unit comprises at least one storage element. Preferably the sensor device is configured to output the at least one sensor signal generated by the evaluation unit as a sensor signal of the sensor device.

A "control unit" is in particular to mean a computing unit on which an, in particular functionally adaptable, preferably programmable, software program, in particular an operation program, can be stored, and/or a hardware unit, which is in particular functionally unchangeable, preferably non-programmable. The hardware unit may, for example, be implemented as an ASIC unit that is configured, in particular manufactured, for a certain function.

By a "computing unit" is in particular a unit to be understood which comprises at least one processor, at least one storage element, like a hard disk and/or a working storage, and/or further electronical components. Preferably the at least one control unit is configured to operate the sensor unit, in particular to switch the sensor unit on and off. Preferably the at least one control unit is configured to operate the evaluation unit, in particular to switch the evaluation unit on and off.

Preferably the at least one control unit is configured to operate the sensor unit and the evaluation unit, in particular to switch the sensor unit and the evaluation unit on and/or off, in particular according to an operation program, in particular at defined times, preferably following a defined time schedule. In particular, the control unit is configured to operate the sensor unit and the evaluation unit in the continuous operation state. In particular, the control unit is configured to switch the sensor unit alternatingly off and on in the continuous operation state. In particular, the control unit is configured to switch the evaluation unit alternatingly off and on in the continuous operation state. Preferably the control unit is configured to switch the sensor unit on for a duration of a switch-on interval, in particular of the sensor unit. Preferably the control unit is configured to switch the sensor unit off for a duration of a switch-off interval, in particular of the sensor unit. Preferably the control unit is configured to switch the evaluation unit on for a duration of a switch-on interval, in particular of the evaluation unit. Preferably the control unit is configured to switch the evaluation unit off for a duration of a switch-off interval, in particular of the evaluation unit. In particular, the control unit is configured to actuate the sensor unit in the continuous operation state in alternating switch-on intervals and switch-off intervals, in particular of the sensor unit. In particular, the control unit is configured to actuate the sensor unit in the continuous operation state in switch-on intervals which are interrupted by switch-off intervals, in particular of the sensor unit. In particular, the control unit is configured to actuate the evaluation unit in the continuous operation state in alternating switch-on intervals and switch-off intervals, in particular, of the evaluation unit. In particular, the control unit is configured to actuate the evaluation unit in the continuous operation state in switch-on intervals interrupted by switch-off intervals, in particular of the evaluation unit.

Preferably the sensor unit is configured, in a switch-on interval, in particular of the sensor unit, which is in particular controlled by the control unit, to generate at least one laser beam and to detect, in particular store, portions, preferably reflected portions, of the at least one laser beam as data. Preferably the laser unit, in particular the at least one laser element, is configured to generate the at least one laser beam in a switch-on interval, in particular of the sensor unit, which is in particular controlled by the control unit. Preferably, the detection unit, in particular the at least one detection element, is configured, in a switch-on interval, in particular of the sensor unit, which is in particular controlled by the control unit, to detect portions, preferably reflected portions, of the at least one laser beam as data. Preferably the evaluation unit, in particular the at least one evaluation element, is configured, in a switch-on interval, in particular of the evaluation unit, which is in particular controlled by the control unit, to generate the at least one sensor signal from the data of the detection unit, in particular of the at least one detection element.

Preferably the evaluation unit, in particular the at least one evaluation element, is configured, in a switch-on interval, in particular of the evaluation unit, which is in particular controlled by the control unit, to capture the data of the detection unit, in particular of the at least one detection element, in particular of the sensor unit, from several switch-on intervals of the sensor unit, in particular of the detection unit, in particular of the at least one detection element, and in particular to store said data.

In particular, the evaluation unit processes, in particular stores, the data which the sensor unit, in particular the detection unit, captures and in particular stores. In particular, the evaluation unit, in particular the at least one evaluation element, is configured for generating, in particular multiplexing, the at least one sensor signal from, in particular stored, data captured by the sensor unit, in particular the detection unit, in at least two different switch-on intervals, in particular of the sensor unit, in particular of the detection unit.

In particular, the evaluation unit is configured to generate the at least one sensor signal from at least two different switch-on intervals of the sensor unit, in particular by a computer operation like, for example, scaling. In particular, the evaluation unit is configured for multiplexing the at least one sensor signal from at least two different switch-on intervals of the sensor unit. In particular, the evaluation unit is configured for generating, in particular multiplexing, the at least one sensor signal from at least two, preferentially at least three, especially preferentially at least four, different switch-on intervals of the sensor unit. The evaluation unit can be configured for generating, in particular multiplexing, the at least one sensor signal from several, in particular a plurality of, like for example five, ten, twenty, fifty, a hundred, a thousand, or the like, different switch-on intervals of the sensor unit, in particular of the detection unit. In particular, the evaluation unit is configured for generating, in particular multiplexing, each sensor signal from at least two, in particular at least three, preferably at least four, different switch-on intervals of the sensor unit.

The implementation of the sensor device according to the invention allows achieving an advantageous temperature development of the sensor device. In particular, an advantageous temperature development of the evaluation unit and/or of the sensor unit is achievable. An advantageous combination of an advantageously high output data rate of the sensor device with an advantageously low operation temperature of the sensor device is achievable. In particular, an advantageously low operation temperature of the sensor device is achievable with advantageously small construction dimensions of the sensor device. An advantageously long lifetime of the sensor device is achievable due to an advantageously low temperature, in particular operation temperature. A moving average, which advantageously results directly from the actuation, can be produced as a sensor signal. It is in particular advantageously possible to dispense with external or additional cooling aggregates.

Furthermore, it is proposed that the evaluation unit is configured for generating at least two sensor signals from laser beams detected in a switch-on interval of the sensor unit. Preferably the evaluation unit is configured for generating at least two sensor signals from data as which the laser beams captured in a single switch-on interval of the sensor unit were captured. Preferably the evaluation unit is configured for generating at least two, preferentially at least three, particularly preferentially at least four, sensor signals from laser beams detected in a switch-on interval of the sensor unit, in particular from data as which the laser beams detected in a single switch-on interval of the sensor unit were captured. Preferably the evaluation unit is configured for generating several sensor signals, in particular a plurality of sensor signals, a plurality being realized, for example, as five, ten, twenty, fifty, a hundred, a thousand, or the like, from laser beams detected in a switch-on interval of the sensor unit, in particular from data as which the laser beams detected in a single switch-on interval of the sensor unit were captured. Preferably the evaluation unit is configured to process the data, as which the laser beams detected in a single switch-on interval of the sensor unit were captured, into at least two, in particular into a plurality of, sensor signals, in particular in each case completely. An advantageously high output data rate is achievable. An advantageously accurate sensor signal is achievable. In particular, an advantageous combination of an advantageously high output data rate of the sensor device with advantageously accurate sensor signals is achievable at an advantageously low temperature of the sensor device, in particular of the evaluation unit and/or of the sensor unit.

It is further proposed that the control unit is configured to temporally offset the switch-on intervals of the sensor unit and the switch-on intervals of the evaluation unit at least partly. Preferably the control unit is configured, in the continuous operation state, to start a first switch-on interval of the sensor unit before a first switch-on interval of the evaluation unit. Preferably the control unit is configured to temporally offset the switch-on intervals of the sensor unit and the switch-on intervals of the evaluation unit at least by 10%, in particular at least by 25%, preferentially at least by 40%, particularly preferentially at least by 75% and very particularly preferentially at least by 100%, of a duration of the switch-on interval of the sensor unit or of the switch-on interval of the evaluation unit. Preferably the control unit is configured to temporally offset the switch-on intervals of the sensor unit and the switch-on intervals of the evaluation unit by less than 300%, in particular by less than 250%, preferentially by less than 200%, particularly preferentially by less than 150% and very particularly preferentially by less than 125%, of a duration of the switch-on interval of the sensor unit or of the switch-on interval of the evaluation unit. Advantageously a temperature development of the sensor unit in a switch-on interval can be at least partly decoupled from a temperature development of the evaluation unit. In particular, an advantageously long lifetime of the sensor device is achievable, preferentially due to an advantageously low operation temperature of the sensor device. In particular, a maximum energy consumption of the sensor device is advantageously reducible.

It is also proposed that the control unit is configured to make the switch-on intervals of the sensor unit follow the switch-on intervals of the evaluation unit with delay. Preferably the control unit is configured to make the switch-on intervals of the sensor unit follow the switch-on intervals of the evaluation unit with a delay of in particular at least 0.001 s. Preferably the control unit is configured to make the switch-on intervals of the sensor unit follow the switch-on intervals of the evaluation unit with a minimum delay of 0.01 s, in particular with a minimum delay of 0.1 s, preferentially with a minimum delay of 1 s, particularly preferentially with a minimum delay of 10 s and very particularly preferentially with a minimum delay of 30 s. Preferably the control unit is configured to make the switch-on intervals of the sensor unit follow the switch-on intervals of the evaluation unit with a maximum delay of at most 12 h, in particular with a maximum delay of at most 6 h, preferentially with a maximum delay of at most 2 h, particularly preferentially with a maximum delay of at most 1 h and very particularly preferentially with a maximum delay of at most 30 min. Preferably the control unit is configured to make the switch-on intervals of the evaluation unit follow the switch-on intervals of the sensor unit directly, in particular without delay, in particular with a maximum delay of at most 0.1 s, preferentially of at most 0.01 s. Preferably the control unit is configured to make the switch-on intervals of the evaluation unit follow the switch-on intervals of the sensor unit with a maximum delay of at most 0.005 s, in particular with a maximum delay of at most 0.002 s, preferentially with a maximum delay of at most 0.001 s, particularly preferentially with a maximum delay of at most 0.0001 s and very particularly preferentially with a maximum delay of at most 0.00001 s. Preferably the control unit is configured to start the switch-off intervals of the evaluation unit in each case already during the switch-off intervals of the sensor unit. The control unit may be configured to make the switch-off intervals of the evaluation unit follow the switch-off intervals of the sensor unit directly, in particular without delay, in particular with a maximum delay of at most 0.1 s, preferentially of at most 0.01 s. The control unit may be configured to make the switch-off intervals of the evaluation unit follow the switch-off intervals of the sensor unit with a delay of in particular at most 10 min, in particular of at most 1 min, preferentially of at most 30 s, particularly preferentially of at most 10 s and very particularly preferentially of at most 5 s. Preferably the control unit is configured to make the switch-off intervals of the sensor unit follow the switch-off intervals of the evaluation unit directly, in particular without delay, in particular with a maximum delay of at most 0.1 s, preferentially of at most 0.01 s. Preferably the control unit is configured to start the switch-off intervals of the sensor unit and the switch-off intervals of the evaluation unit with a maximum delay of at most 0.001 s, in particular with a maximum delay of at most 0.01 s, preferentially with a maximum delay of at most 0.1 s, particularly preferentially with a maximum delay of at most 0.2 s and very particularly preferentially with a maximum delay of at most 0.5 s relative to each other. An advantageously prompt evaluation of captured data, in particular of captured, preferentially detected, in particular reflected, laser beams, is achievable. It is in particular possible that a quick evaluation of the data by the evaluation unit is combined with an advantageous cooling delay of the sensor unit after operation of the evaluation unit.

Beyond this it is proposed that the evaluation unit is configured to generate different sensor signals at a maximum temporal distance of 60 s to each other. Preferably the evaluation unit is configured to generate different sensor signals, in particular all sensor signals, at a maximum temporal distance of 30 s, in particular at a maximum temporal distance of 20 s, in particular at a maximum temporal distance of 15 s, preferentially at a maximum temporal distance of 10 s, particularly preferentially at a maximum temporal distance of 5 s, and very particularly preferentially at a maximum temporal distance of 3 s to each other. The evaluation unit may be configured to generate different sensor signals, in particular all sensor signals, at a maximum temporal distance of 2 s, in particular at a maximum temporal distance of 1 s, in particular at a maximum temporal distance of 0.5 s, preferentially at a maximum temporal distance of 0.2 s, particularly preferentially at a maximum temporal distance of 0.1 s and very particularly preferentially at a maximum temporal distance of 0.01 s, to each other. Preferentially the evaluation unit is configured to generate different sensor signals, in particular all sensor signals, at a maximum temporal distance which maximally corresponds to a duration of two switch-off intervals of the evaluation unit or of the sensor unit. Preferably the evaluation unit is configured to generate different sensor signals, in particular all sensor signals, at a maximum temporal distance which maximally corresponds to a duration of two switch-on intervals of the evaluation unit or of the sensor unit. Preferably the evaluation unit is configured to generate different sensor signals, in particular all sensor signals, at a maximum temporal distance which maximally corresponds to a duration of one switch-on interval and one switch-off interval of the evaluation unit or of the sensor unit. Alternatively the evaluation unit may be configured to generate different sensor signals, in particular all sensor signals, at a maximum temporal distance of 24 h, in particular at a maximum temporal distance of 16 h, in particular at a maximum temporal distance of 16 h, in particular at a maximum temporal distance of 12 h, preferentially at a maximum temporal distance of 8 h, particularly preferentially at a maximum temporal distance of 4 h and very particularly preferentially at a maximum temporal distance of 2 h, to each other. Alternatively, the evaluation unit may be configured to generate different sensor signals, in particular all sensor signals, at a maximum temporal distance of 60 min, in particular at a maximum temporal distance of 45 min, in particular at a maximum temporal distance of 30 min, preferentially at a maximum temporal distance of 15 min, particularly preferentially at a maximum temporal distance of 5 min and very particularly preferentially at a maximum temporal distance to 2 min, to each other. An advantageously high Output Data Rate is achievable. In particular, a risk of an occurrence of blind-time spots of the detection unit is advantageously reducible.

It is moreover proposed that the control unit is configured to limit the switch-on intervals of the sensor unit and the switch-on intervals of the evaluation unit to a duration of maximally 60 s.

Preferably the control unit is configured to limit the switch-on intervals of the sensor unit, in particular all switch-on intervals of the sensor unit, to a duration of maximally 30 s, in particular of maximally 20 s, preferentially of maximally 15 s, particularly preferentially of maximally 12 s and very particularly preferentially of maximally 10 s. The control unit may be configured to limit the switch-on intervals of the sensor unit, in particular all switch-on intervals of the sensor unit, to a duration of maximally 24 h, in particular of maximally 12 h, preferentially of maximally 8 h, particularly preferentially of maximally 4 h and very particularly preferentially of maximally 1 h. The control unit may be configured to limit the switch-on intervals of the sensor unit, in particular all switch-on intervals of the sensor unit, to a duration of maximally 0.1 s, in particular of maximally 0.05 s, preferentially of maximally 0.04 s, particularly preferentially of maximally 0.02 s and very particularly preferentially of maximally 0.01 s.

Preferably the control unit is configured to limit the switch-on intervals of the evaluation unit, in particular all switch-on intervals of the evaluation unit, to a duration of maximally 30 s, in particular of maximally 20 s, preferentially of maximally 15 s, particularly preferentially of maximally 12 s and very particularly preferentially of maximally 10 s. Preferably the control unit is configured to limit the switch-off intervals of the sensor unit, in particular all switch-off intervals of the sensor unit, to a duration of maximally 30 s, in particular of maximally 20 s, preferentially of maximally 15 s, particularly preferentially of maximally 12 s and very particularly preferentially of maximally 10 s. Preferably the control unit is configured to limit the switch-off intervals of the evaluation unit, in particular all switch-off intervals of the evaluation unit, to a duration of maximally 30 s, in particular of maximally 20 s, preferentially of maximally 15 s, particularly preferentially of maximally 12 s and very particularly preferentially of maximally 10 s. Preferably the control unit is configured to limit all switch-on intervals of the sensor unit, in particular all switch-on intervals of the sensor unit, to a duration of minimally 0.1 s, in particular of minimally 1 s, preferentially of minimally 2 s, particularly preferentially of minimally 3 s and very particularly preferentially of minimally 5 s. Preferably the control unit is configured to limit the switch-on intervals of the evaluation unit, in particular all switch-on intervals of the evaluation unit, to a duration of minimally 0.001 s, in particular of minimally 0.01 s, preferentially of minimally 0.1 s, particularly preferably of minimally 0.2 s and very particularly preferably of minimally 0.5 s. Preferably the control unit is configured to limit the switch-off intervals of the sensor unit, in particular all switch-off intervals of the sensor unit, to a duration of minimally 0.1 s, in particular of minimally 1 s, preferentially of minimally 2 s, especially preferentially of at least 3 s and very particularly preferentially of minimally 5 s. Preferably the control unit is configured to delimit the switch-off intervals of the evaluation unit, in particular all switch-off intervals of the evaluation unit, to a duration of at least 0.1 s, in particular of at least 1 s, preferentially of at least 2 s, particularly preferentially of at least 3 s and very particularly preferentially of at least 5 s. An advantageously short heating-up phase of the sensor device, in particular of the evaluation unit and/or of the sensor unit, is achievable. In particular, phases of conveying heat away are advantageously achievable for the sensor unit and/or for the evaluation unit. An advantageous real-time measurement is achievable. In particular, an advantageous storage relief of the at least one sensor unit, in particular of the at least one detection unit, is achievable.

Furthermore, it is proposed that the control unit is configured to vary a duration of the switch-on intervals, in particular of at least one switch-on interval, of the evaluation unit, in particular depending on laser beams detected by the sensor unit. Preferably the control unit is configured to vary a duration of the switch-on intervals of the evaluation unit, in particular of at least one switch-on interval of the evaluation unit, between maximally 5 s and minimally 0.1 s, in particular depending on laser beams detected by the sensor unit. Preferably the control unit is configured to vary a duration of the switch-on intervals of the evaluation unit, in particular of at least one switch-on interval of the evaluation unit, with a lower limit of at least 0.1 s, in particular depending on laser beams detected by the sensor unit. Preferably the control unit is configured to vary a duration of the switch-on intervals of the evaluation unit, in particular of at least one switch-on interval of the evaluation unit, with an upper limit of maximally 5 s, in particular depending on laser beams detected by the sensor unit. Preferably the control unit is configured to vary a duration of the switch-on intervals of the evaluation unit, in particular of at least one switch-on interval of the evaluation unit, depending on laser beams detected by the sensor unit, and to do this in such a way that a duration of the switch-on intervals of the evaluation unit, in particular of at least one switch-on interval of the evaluation unit, is the longer the more laser beams were detected in the preceding switch-on intervals of the sensor unit, from which the at least one sensor signal is to be generated in the current, temporally varied switch-on interval, in particular the more laser beams were captured as data in the preceding switch-on intervals of the sensor unit, from which the evaluation unit generates the at least one sensor signal in the current, temporally varied switch-on interval of the evaluation unit. An advantageously slow, in particular application-specific, temperature development of the evaluation unit is achievable.

It is moreover proposed that the sensor device comprises at least one temperature sensor, which is configured to capture a temperature of the evaluation unit and/or of the sensor unit, the control unit being configured to vary a duration of the switch-on intervals of the evaluation unit, a duration of the switch-off intervals of the evaluation unit, a duration of the switch-on intervals of the sensor unit and/or a duration of the switch-off intervals of the sensor unit, in particular depending on a temperature of the evaluation unit and/or of the sensor unit. The temperature sensor is an optional element of the sensor device, which may in particular be arranged externally to the sensor device and is in particular capable of a wireless data transmission via the control unit. The temperature sensor may be arranged outside the sensor device, in particular outside a sensor housing. The temperature sensor may be implemented, for example, as an NTC element, as a PTC element, in particular as a platinum element, as a quartz element, as an expansion element, like in particular as a fiber Bragg element, or something like that. Preferably the at least one temperature sensor is connected to the evaluation unit and to the sensor unit, in particular for a capturing of a temperature of the evaluation unit and/or of a temperature of the sensor unit. The control unit is preferably configured to vary a duration of the switch-on intervals of the evaluation unit and a duration of the switch-off intervals of the evaluation unit depending on the temperature of the evaluation unit. The control unit is preferably configured to vary a duration of the switch-on intervals of the evaluation unit and a duration of the switch-off intervals of the evaluation unit depending on the temperature of the sensor unit and/or of the evaluation unit. The control unit is preferably configured to shorten a duration of the switch-on intervals of the evaluation unit above a limit temperature of the sensor unit and/or of the evaluation unit, and/or to extend a duration of the switch-off intervals of the evaluation unit above a limit temperature of the sensor unit and/or of the evaluation unit. The control unit is preferably configured to vary a duration of the switch-on intervals of the sensor unit and/or a duration of the switch-off intervals of the sensor unit depending on the temperature of the sensor unit. The control unit is configured to shorten a duration of the switch-on intervals of the sensor unit above a limit temperature of the sensor unit and/or of the evaluation unit, and/or to extend a duration of the switch-off intervals of the sensor unit above a limit temperature of the sensor unit and/or of the evaluation unit. An advantageously constant operation temperature of the evaluation unit and/or of the sensor unit is achievable. In particular, an advantageously long lifetime of the sensor device, in particular of the evaluation unit and/or of the sensor unit, is achievable.

It is further proposed that the at least two switch-on intervals of the sensor unit together have a duration that depends on laser beams detected by the sensor unit. Preferably the control unit is configured to vary an added-up duration of the at least two switch-on intervals of the sensor unit between maximally 24 h and minimally 0.01 s, in particular depending on laser beams detected by the sensor unit. Preferably the control unit is configured to vary an added-up duration of the at least two switch-on intervals of the sensor unit with a lower limit of at least 0.01 s, preferentially of at least 0.1 s, particularly preferentially of at least 0.5 s and very particularly preferentially of at least 1 s, in particular depending on laser beams detected by the sensor unit. Preferably the control unit is configured to vary an added-up duration of the at least two switch-on intervals of the sensor unit with an upper limit of at most 24 h, preferentially of at most 1 h, particularly preferentially of at most 10 min and very particularly preferentially of at most 10 s, in particular depending on laser beams detected by the sensor unit. Preferably the control unit is configured to vary an added-up duration of the at least two switch-on intervals of the sensor unit depending on laser beams detected by the sensor unit, and to do that in such a way that a duration of the switch-on intervals of the sensor unit, in particular of at least one switch-on interval of the sensor unit, is the shorter the more laser beams were detected in the current switch-on interval of the sensor unit, in particular in the preceding switch-on intervals of the sensor unit, in particular the more laser beams were captured as data in the current switch-on interval of the sensor unit, in particular in the preceding switch-on intervals of the sensor unit, in particular the smaller a measurement inaccuracy is in the current switch-on interval of the sensor unit, in particular in the preceding switch-on intervals of the sensor unit. In particular, the evaluation unit is configured for generating, in particular multiplexing, sensor signals from different switch-on intervals of the sensor unit, which together have a duration of at least 5 s, preferentially of at least 6 s, particularly preferentially of at least 8 s and very particularly preferentially of at least 9 s, in particular of at least 10 s. In particular, the evaluation unit is configured for generating, in particular multiplexing, the at least one sensor signal, in particular all sensor signals, from at least two, preferably from at least three, particularly preferentially from at least four different switch-on intervals of the sensor unit, which together have a duration of at least 4 s, prefentially of at least 5 s, especially preferentially of at least 8 s and very especially preferentially of at least 9 s, in particular of at least 10 s. It is possible to generate an advantageously accurate sensor signal covering advantageously large switch-on interval periods. In particular, depending on an error in a measurement, a reliable sensor signal can be outputted as soon as possible. An advantageously quick data output is achievable with accurate measurements.

Beyond this it is proposed that the control unit is configured to limit the switch-on intervals of the sensor unit and the switch-on intervals of the evaluation unit all to a same duration. Preferably the control unit is configured to limit all switch-on intervals of the sensor unit to a same duration. Preferably the control unit is configured to limit all switch-on intervals of the evaluation unit to a same duration. The control unit may be configured to limit at least one switch-on interval of the sensor unit and at least one switch-on interval of the evaluation unit to a same duration. The control unit may be configured to limit at least two switch-on intervals of the sensor unit to a same duration. The control unit may be configured to limit at least two switch-on intervals of the evaluation unit to a same duration. An advantageously uniform continuous operation state is achievable. In particular, an advantageously estimable lifetime of the sensor device, in particular of the sensor unit and/or of the evaluation unit, is achievable.

It is further proposed that the control unit is configured to limit the switch-off intervals of the sensor unit and the switch-off intervals of the evaluation unit all to a same duration. Preferably the control unit is configured to limit all switch-off intervals of the sensor unit to a same duration. Preferably the control unit is configured to limit all switch-off intervals of the evaluation unit to a same duration. Preferably the control unit is configured to limit all switch-off intervals of the evaluation unit and all switch-off intervals of the sensor unit to a same duration. The control unit may be configured to limit at least two switch-off intervals of the sensor unit to a same duration. The control unit may be configured to limit at least two switch-off intervals of the evaluation unit to a same duration. The control unit may be configured to limit at least one switch-off interval of the evaluation unit and at least one switch-off interval of the sensor unit to a same duration. An advantageously uniform continuous operation state is achievable. In particular, an advantageously assessable lifetime of the sensor device, in particular of the sensor unit and/or of the sensor device, is achievable.

Moreover, a particulate matter sensor with a sensor device according to the invention is proposed. In particular, the particulate matter sensor may comprise a plurality of sensor devices. In particular, the temperature sensor may be connected to the particulate matter sensor, in particular spaced apart from the sensor device. The particulate matter sensor may in particular be embodied as a particle counter. The particulate matter sensor may in particular be configured for measuring particle sizes, particle types and/or particle velocities. An advantageously long-lived particulate matter sensor is achievable.

The sensor device according to the invention and/or the particulate matter sensor according to the invention are/is herein not to be limited to the application and implementation described above. In particular, in order to fulfill a functionality that is described here, the sensor device according to the invention and/or the particulate matter sensor according to the invention may comprise a number of individual elements, components and units that differs from a number given here. Furthermore, as regards the value ranges given in the present disclosure, values within the limits mentioned shall also be considered to be disclosed and to be applicable according to requirements.

DRAWING

Further advantages will become apparent from the following description of the drawing. In the drawing an exemplary embodiment of the invention is illustrated. The drawing, the description and the claims contain a plurality of features in combination. Someone skilled in the art will purposefully also consider the features separately and will find further expedient combinations.

It is shown in.

DESCRIPTION OF THE EXEMPLARY EMBODIMENT

Figure 1:
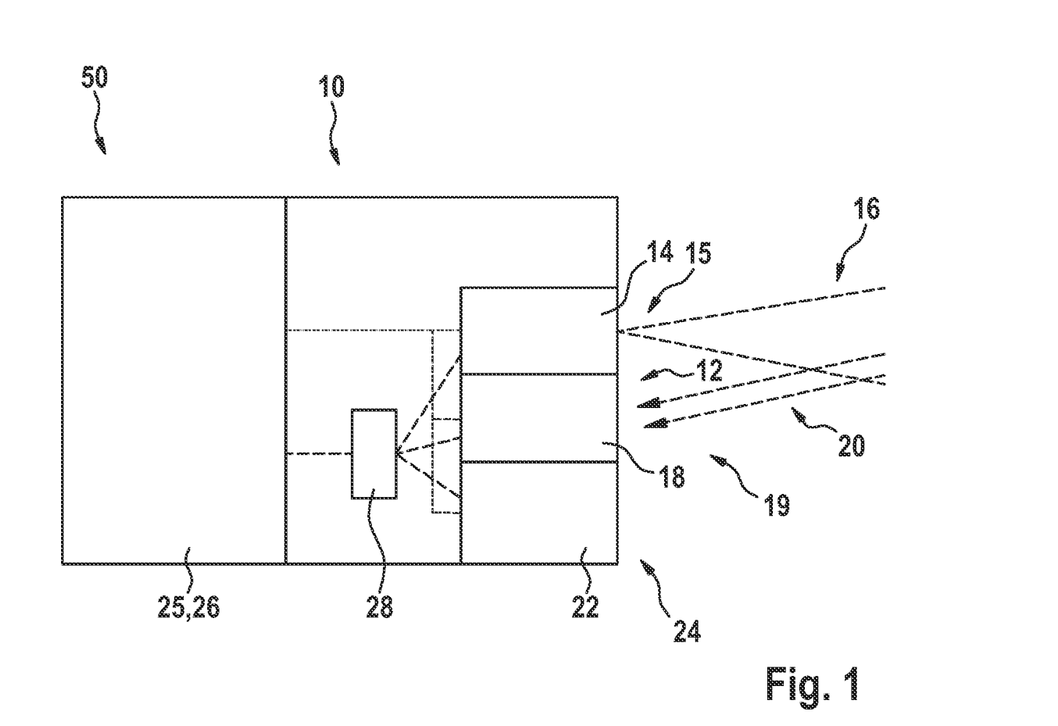
FIG. 1 a particulate matter sensor according to the invention with a sensor device according to the invention, in a schematic representation, FIG. 2 diagrams of a continuous operation state of the sensor device according to the invention, in a schematic representation, FIG. 3 diagrams of a continuous operation state of the sensor device according to the invention, in a schematic representation, FIG. 4 diagrams of a continuous operation state of the sensor device according to the invention, in a schematic representation, FIG. 5 diagrams of a continuous operation state of the sensor device according to the invention, in a schematic representation, and FIG. 6 diagrams of a continuous operation state of the sensor device according to the invention, in a schematic representation.

FIG. 1 shows a particulate matter sensor 50. The particulate matter sensor 50 comprises a sensor device 10. The particulate matter sensor 50 comprises a sensor housing. The sensor device 10 is arranged in the sensor housing. The particulate matter sensor 50 is in particular configured for measuring a number of particles. The particulate matter sensor 50, in particular the sensor housing, in particular comprises a data interface for a coupling with an external device, in particular for an, in particular wireless, signal transmission.

The sensor device 10 comprises a sensor unit 12. The sensor unit 12 comprises a laser unit 14 for a generation of at least one laser beam 16. The sensor unit 12 comprises a detection unit 18 for a detection of, in particular reflected, laser beams 20. The laser unit 14 comprises a laser element 15 for a generation of the laser beam 16. The laser element 15 is embodied as a vertical-cavity edge emitter.

The detection unit 18 is configured for a detection of reflected laser beams 20. The detection unit 18 comprises a detection element 19 for a detection of reflected laser beams 20, which were in particular originally generated by the laser unit 14, in particular the laser element 15. The detection element 19 is implemented as a photodetector, in particular as a photodiode. The detection unit 18 comprises a storage element. The detection unit 18 is configured to store the last-measured ten thousand data, in particular data units.

The laser unit 14 and the detection unit 18 are implemented as a structural-component unit. In particular, the sensor unit 12 is implemented as a structural-component unit. The laser element 15 is indirectly connected to the detection element 19. In particular, the laser element 15 is connected to the detection element 19 in such a way that it is immovable with respect to the detection element 19. The laser element 15 and the detection element 19, in particular the laser unit 14 and the detection unit 18, are embodied as a vertical-cavity edge emitter with integrated photodiode.

The sensor device 10 comprises an evaluation unit 22. The evaluation unit 22 is configured to process detected laser beams 20 into sensor signals 39, 39', 39'', 39''' (see FIG. 2). The evaluation unit 22 is connected to the sensor unit 12 for a data transmission. The evaluation unit 22 comprises a storage element. The evaluation unit 22 is configured to store the last-generated ten thousand sensor signals 39.

The evaluation unit 22 comprises an evaluation element 24. The evaluation element 24 is configured to process the detected laser beams 20 into at least one sensor signal 39. The evaluation element 24 is embodied as an application-specific integrated circuit, in particular as an ASIC element.

The sensor device 10 is configured to output the sensor signal 39 generated by the evaluation unit 22 as a sensor signal 39 of the sensor device 10.

The sensor device 10 comprises a control unit 26, which is implemented as a computing unit 25. The control unit comprises a processor, a working storage and a hard disk, which are connected to one another, in particular for the purpose of implementing the control unit 26. The control unit 26 is configured to operate the sensor unit 12, in particular to switch the sensor unit 12 on and off. The control unit 26 is configured to operate the evaluation unit 22, in particular to switch the evaluation unit 22 on and off.

The control unit 26 is configured to operate the sensor unit 12 and the evaluation unit 22, in particular to switch the sensor unit 12 and the evaluation unit 22 on and off, in particular independently from each other, according to an operation program, in particular at defined times, for example following a defined time schedule. The control unit 26 is configured, in a continuous operation state, for operating the sensor unit 12 and the evaluation unit 22, to actuate the sensor unit 12 and the evaluation unit 22 in alternating switch-on intervals 31, 43 and switch-off intervals 33, 45. The control unit 26 is connected to the sensor unit 12, in particular the laser unit 14, in particular the detection unit 18. The control unit 26 is connected to the evaluation unit 22, in particular for a data transmission.

The sensor device 10 comprises a temperature sensor 28. The temperature sensor 28 is embodied as a Pt1000 element. The temperature sensor 28 is configured to capture a temperature of the evaluation unit 22 and of the sensor unit 12. The temperature sensor 28 is connected to the evaluation unit 22 and to the sensor unit 12, in particular for the purpose of capturing the temperature of the evaluation unit 22 and the temperature of the sensor unit 12. The control unit 26 is connected to the temperature sensor 28, in particular for a transmission of the temperatures of the sensor unit 12 and of the evaluation unit 22.

Figure 2:
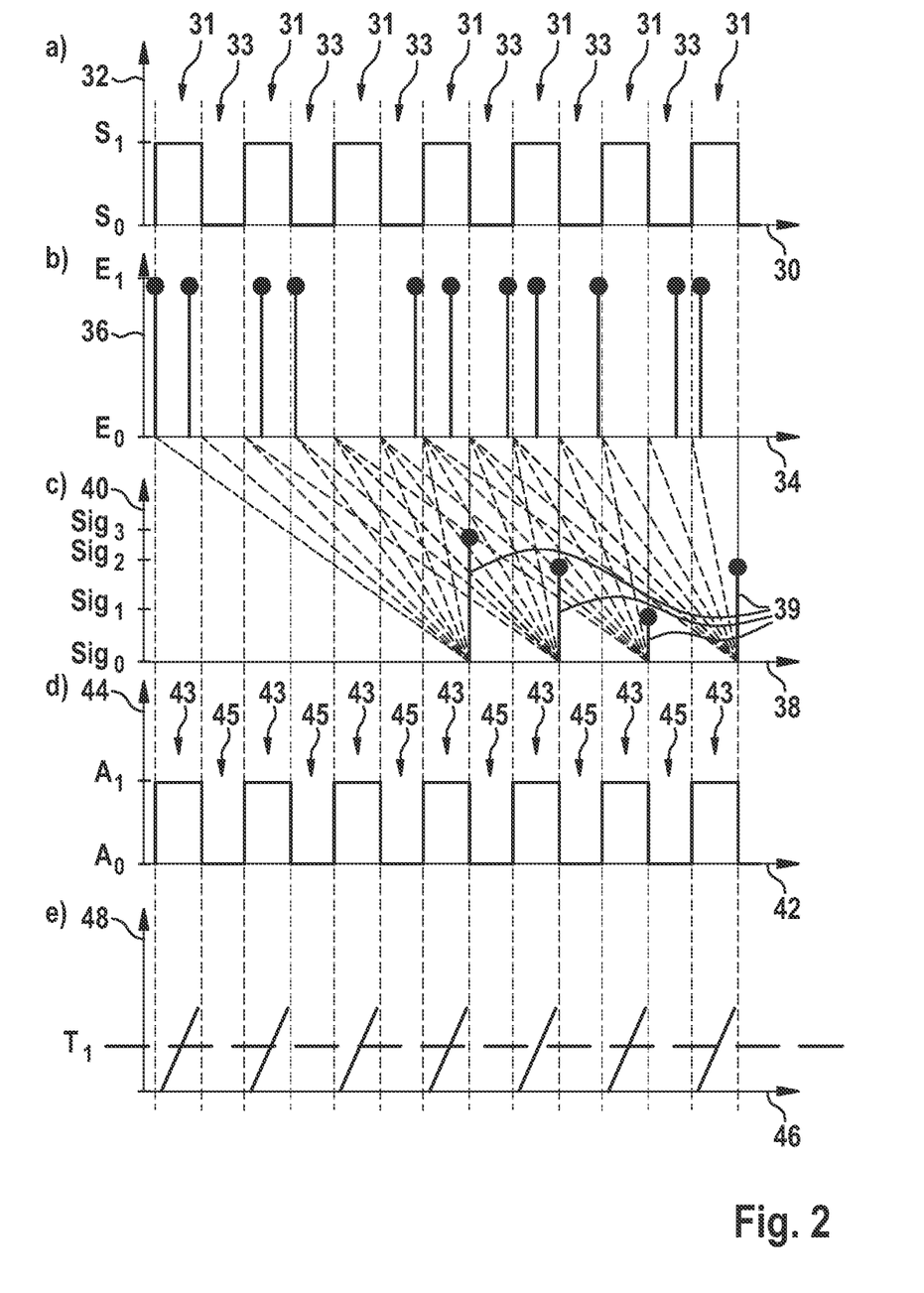

FIG. 2 shows possible flow diagrams of the continuous operation state of the sensor device 10, in particular of the control unit 26. In particular, FIG. 2 may be understood as an exemplary time interval, in particular as a portion of the continuous operation state, of the continuous operation state of the sensor device 10, in particular of the control unit 26.

Diagram a) of FIG. 2 in particular shows a diagram with an abscissa 30, on which a time is plotted, and an ordinate 32, on which two switch states $S_0$ and $S_1$ of the sensor unit are plotted. The switch state $S_0$ corresponds to an off state of the sensor unit 12. The switch state $S_1$ corresponds to an on state of the sensor unit 12.

Diagram b) of FIG. 2 in particular shows a diagram with an abscissa 34, which in particular corresponds to the abscissa 30, and an ordinate 36, on which events which are detectable by the detection unit 18 are plotted as event states $E_0$ and $E_1$.

Diagram c) of FIG. 2 in particular shows a diagram with an abscissa 38, which in particular corresponds to the abscissa 30, and an ordinate 40, on which sensor signals 39 generated by the evaluation unit 22 are plotted as event states $Sig_0$, $Sig_1$, $Sig_2$ and $Sig_3$.

Diagram d) of FIG. 2 in particular shows a diagram with an abscissa 42, which in particular corresponds to the abscissa 30, and an ordinate 44, on which two switch states $A_0$ and $A_{01}$ of the evaluation unit 22 are plotted. The switch state $A_0$ corresponds to an off state of the evaluation unit 22. The switch state $A_1$ corresponds to an on state of the evaluation unit 22.

Diagram e) of FIG. 2 in particular shows a diagram with an abscissa 46, which in particular corresponds to the abscissa 30, and an ordinate 48, on which a temperature of the sensor unit 12, in particular of the laser unit 14, is plotted.

In the continuous operation state the control unit 26 controls the sensor unit 12 and the evaluation unit 14 into respective on states and/or off states.

The control unit 26 operates the sensor unit 12 in the continuous operation state by repeatedly switching the sensor unit 12 on and off. In diagram a) of FIG. 2 several switch-on intervals 31 of the sensor unit 12 are shown. In a switch-on interval 31 of the sensor unit 12, the sensor unit 12 is in an on state $S_1$. In diagram a) of FIG. 2 several switch-off intervals 33 of the sensor unit 12 are shown. In a switch-off interval 33 of the sensor unit 12, the sensor unit 12 is in an off state $S_0$.

The control unit 26 operates the evaluation unit 22 in the continuous operation state by repeatedly switching the evaluation unit 12 on and off. In diagram d) of FIG. 2 several switch-on intervals 43 of the evaluation unit 22 are shown. In a switch-on interval 43 of the evaluation unit 22, the evaluation unit 22 is in an on state $A_1$. In diagram d) of FIG. 2 several switch-off intervals 45 of the evaluation unit 22 are shown. In a switch-off interval 45 of the evaluation unit 22, the evaluation unit 22 is in an off state $A_0$.

The control unit 26 operates the sensor unit 12 and the evaluation unit 22 in the continuous operation state according to an operation program that gives defined switch-on times and switch-off times for the sensor unit 12 and for the evaluation unit 22.

For each duration of the switch-on intervals 31 of the sensor unit 12, the control unit 26 switches the sensor unit 12 on for a generation of the laser beam 16 and for a detection of reflected laser beams 20. For each duration of the switch-off intervals 33 of the sensor unit 12, the control unit 26 switches the sensor unit 12 off, in particular for the purpose of stopping a heating of the sensor unit 12.

Diagram b) of FIG. 2 shows events detectable by the sensor unit 12, in particular by the detection unit 18, as event states $E_0$ and $E_1$. The detectable events symbolize reflected laser beams 20 hitting onto the detection element 19, in particular onto the detection unit 18. If a detectable event, in particular a reflected laser beam 20, hits onto the detection element 19, in particular onto the detection unit 18, in a switch-on interval 31 of the sensor unit 12, the event will be detected in the form of data. If in a switch-on interval 31 of the sensor unit 12 no detectable event, in particular no reflected laser beam 20, hits onto the detection element 19, in particular onto the detection unit 18, no event will be detected in the form of data, in particular data units, and the data, in particular data units, from this switch-on interval 31 of the sensor unit 12 are implemented as zero data. The control unit 26 operates the sensor unit 12 for a storage of the data from the switch-on intervals 31 of the sensor unit 12. The sensor unit 12 is configured for a generation of the laser beam 16 in the switch-on intervals 31 of the sensor unit 12 and for a detection and storage of reflected portions of the laser beam 16, in particular the reflected laser beams 20, as data. The detection unit 18 is configured to store the last-captured ten thousand data units. Data captured in a switch-on interval 31 of the sensor unit 12 correspond to one data unit.

For each duration of the switch-on intervals 43 of the evaluation unit 22, the control unit 26 switches the evaluation unit 22 on for an evaluation of the data, in particular the detected laser beams 20, of the sensor unit 12, in particular of the detection unit 18.

For each duration of the switch-off intervals 45 of the evaluation unit 22, the control unit 26 switches the evaluation unit 22 off, in particular for stopping a heating of the evaluation unit 22 and in particular for stopping a heating of the sensor unit 12 by heat transfer.

Diagram c) of FIG. 2 shows sensor signals 39, which were generated by the evaluation unit 22 towards an end of switch-on intervals 43 of the evaluation unit 22, as event states $Sig_0$, $Sig_1$, $Sig_2$ and $Sig_3$.

The evaluation unit 22, in particular the evaluation element 24, is configured to capture and store, in a switch-on interval 43 of the evaluation unit 22, the data, in particular data units, of the detection unit 18, in particular of the detection element 19, in particular of the sensor unit 12, from several switch-on intervals 31 of the sensor unit 12. The evaluation unit 22, in particular the evaluation element 24, is configured to generate the sensor signals 39 from the data of the detection unit 18, in particular of the detection element 19, in a switch-on interval 43 of the evaluation unit 22. In switch-on intervals 43 of the evaluation unit 22, the evaluation unit 22 generates sensor signals 39, in particular from the fourth—in particular with a progression of time—switch-on interval 43 of the evaluation unit 22 on. In particular with a progression of time, the first three sensor signals 39—by way of example—are implemented as event states $Sig_0$, in particular as zero signals, in particular as a minimum number of switch-on intervals 31 of the sensor unit 12 have not been gone through yet.

The evaluation unit 22 generates—by way of example—each sensor signal 39 from the data of the last four switch-on intervals 31 of the sensor unit 12. In particular, the evaluation unit 22 processes, in particular stores, the data which the sensor unit 12, in particular the detection unit 18, captures and in particular stores. In particular, the evaluation unit 22, in particular the evaluation element 24, is configured for generating, in particular multiplexing, the sensor signals 39 from data, in particular stored data, which were captured by the sensor unit 12, in particular the detection unit 18, in four different switch-on intervals 31 of the sensor unit 12.

The sensor signals 39 are generated by the evaluation unit 22—by way of example—depending on the number of detected laser beams 20 in the corresponding last four switch-on intervals 31 of the sensor unit 12.

Diagram e) of FIG. 2 shows a temperature development of the laser unit 14 in the switch-on intervals 31 of the sensor unit 12. In particular, an average temperature $T_1$ is shown in diagram e) of FIG. 2. During the switch-on intervals 31 of the sensor unit 12, the temperature of the laser unit 14 increases in each case. The temperature of the laser unit 14 decreases during the switch-off intervals 33 of the sensor unit 12 in each case approximately by the value by which the temperature has increased during the switch-on intervals 31. The temperature progression is meant to be exemplary for a temperature equilibrium phase of the continuous operation state, wherein the temperature equilibrium phase occurs quickly following a start phase, in which the temperature cools down less between the switch-on intervals 31 of the sensor unit 12 than the temperature has increased during the switch-on intervals 31 of the sensor unit 12.

The control unit 26 is configured to limit the switch-on intervals 31 of the sensor unit 12 and the switch-on intervals 43 of the evaluation unit 22 all to a same duration, which is in particular 1 s respectively. By way of example, the control unit 26 is configured temporarily, in particular during the whole continuous operation state, to limit the switch-on intervals 31 of the sensor unit 12 and the switch-on intervals 43 of the evaluation unit 22 all to a same duration, in particular to 1 s respectively. By way of example, the control unit 26 limits temporarily, in particular during the whole continuous operation state, the switch-on intervals 31 of the sensor unit 12 and the switch-on intervals 43 of the evaluation unit 22 all to a same duration, which is in particular 1 s respectively. By way of example, the control unit 26 is configured temporarily, in particular during the whole continuous operation state, to limit all switch-on intervals 31 of the sensor unit 12 to a same duration. By way of example, the control unit 26 is configured temporarily, in particular during the whole continuous operation state, to limit all switch-on intervals 43 of the evaluation unit 22 to a same duration.

The control unit 26 is configured to limit the switch-off intervals 33 of the sensor unit 12 and the switch-off intervals 45 of the evaluation unit 22 all to a same duration, which is in particular 1 s respectively. By way of example, the control unit 26 is configured temporarily, in particular during the whole continuous operation state, to limit the switch-off intervals 33 of the sensor unit 12 and the switch-off intervals 45 of the evaluation unit 22 all to a same duration, in particular to 1 s respectively. By way of example, the control unit 26 limits temporarily, in particular during the whole continuous operation state, the switch-off intervals 33 of the sensor unit 12 and the switch-off intervals 45 of the evaluation unit 22 all to a same duration, which is in particular 1 s respectively. By way of example, the control unit 26 limits temporarily, in particular during the whole continuous operation state, all switch-off intervals 33 of the sensor unit 12 to a same duration, which is in particular 1 s. By way of example, the control unit 26 limits temporarily, in particular during the whole continuous operation state, all switch-off intervals 45 of the evaluation unit 22 to a same duration of in particular 1 s. By way of example, the control unit 26 limits temporarily, in particular during the whole continuous operation state, all switch-off intervals 45 of the evaluation unit 22 and all switch-off intervals 33 of the sensor unit 12 to a same duration of in particular 1 s.

The control unit 26 is configured to limit the switch-on intervals 31 of the sensor unit 12 and the switch-on intervals 43 of the evaluation unit 22 to a duration of maximally 60 s, for example temporarily, in particular during the whole continuous operation state. By way of example, the control unit 26 limits temporarily, in particular during the whole continuous operation state, the switch-on intervals 31 of the sensor unit 12 and the switch-on intervals 43 of the evaluation unit 22 to a duration of maximally 60 s. By way of example, the control unit 26 limits temporarily, in particular during the whole continuous operation state, all switch-off intervals 33 of the sensor unit 12 to a duration of maximally 4 s. By way of example, the control unit 26 limits temporarily, in particular during the whole continuous operation state, all switch-off intervals 45 of the evaluation unit 22 to a duration of maximally 4 s.

The evaluation unit 22 is, for example temporarily, in particular during the whole continuous operation state, configured to generate different sensor signals 39 at a maximum temporal distance of 60 s to each other. The evaluation unit 22 is, for example temporarily, in particular during the whole continuous operation state, configured to generate different, in particular all, sensor signals 39 at a maximum temporal distance of 60 s to each other. The evaluation unit 22 generates, for example temporarily, in particular during the whole continuous operation state, different, in particular all, sensor signals 39 at a maximum temporal distance of 60 s to each other. The evaluation unit 22 is, for example temporarily, in particular during the whole continuous operation state, configured to generate all sensor signals 39 at a maximum temporal distance that maximally corresponds to a duration of two switch-off intervals 33, 45 of the evaluation unit 22 or of the sensor unit 12. The evaluation unit 22 is, for example temporarily, in particular during the whole continuous operation state, configured to generate all sensor signals 39 at a maximum temporal distance that maximally corresponds to a duration of two switch-on intervals 31, 43 of the evaluation unit 22 or of the sensor unit 12. The evaluation unit 22 is, for example temporarily, in particular during the whole continuous operation state, configured to generate all sensor signals 39 at a maximum temporal distance that maximally corresponds to a duration of one switch-on interval 31, 43 and one switch-off interval 33, 45 of the evaluation unit 22 or of the sensor unit 12.

The evaluation unit 22 is, for example temporarily, in particular during the whole continuous operation state, configured to generate the sensor signals 39 from four different switch-on intervals 31 of the sensor unit 12. The evaluation unit 22 generates, for example temporarily, in particular during the whole continuous operation state, the sensor signals 39 in each case from four different switch-on intervals 31 of the sensor unit 12, in particular by a computing operation, like for example by scaling, addition, averaging, or the like. For example, the switch-on intervals 31 of the sensor unit 12, which the evaluation unit 22 generates in each case a sensor signal 39 from, together have a duration of at least 4 s. The switch-on intervals 31 of the sensor unit 12, which the evaluation unit 22 generates in each case a sensor signal 39 from, together have a duration that depends on laser beams 20 detected by the sensor unit 12. The switch-on intervals 31 of the sensor unit 12, which the evaluation unit 22 generates in each case a sensor signal 39 from, have an added-up duration that is varied by the control unit 26, depending on laser beams 20 detected by the sensor unit 12, in such a way that an added-up duration of the switch-on intervals 31 of the sensor unit 12, which the evaluation unit 22 generates in each case a sensor signal 39 from, is the shorter the more laser beams 20 were detected in the current switch-on interval 31 of the sensor unit 12, in particular the more laser beams 20 were captured as data in the current switch-on interval 31 of the sensor unit 12, in particular the smaller a measurement inaccuracy is in the current switch-on interval 31 of the sensor unit 12.

The evaluation unit 22 is, for example temporarily, in particular during the whole continuous operation state, configured to generate the sensor signals 39 from four different switch-on intervals 31 of the sensor unit 12, wherein the switch-on intervals 31 of the sensor unit 12 together have a duration of at least 4 s. The evaluation unit 22 generates, for example temporarily, in particular during the whole continuous operation state, the sensor signals 39 from four different switch-on intervals 31 of the sensor unit 12, the four different switch-on intervals 31 of the sensor unit 12 together having a duration of at least 4 s.

The evaluation unit 22 is, for example temporarily, in particular during the whole continuous operation state, configured to generate four sensor signals 39 from laser beams 20 detected in a switch-on interval 31 of the sensor unit 12. The evaluation unit 22 generates, for example temporarily, in particular during the whole continuous operation state, four sensor signals 39 from laser beams 20 detected in a switch-on interval 31 of the sensor unit 12. Each sensor signal 39 generated by the evaluation unit 22 is partially implemented of data from four different switch-on intervals 31 of the sensor unit 12, in particular of four different data units. Each switch-on interval 31 provides data for four different sensor signals 39.

The evaluation unit 22 generates, for example temporarily, in particular during the whole continuous operation state, four sensor signals 39 from data as which the laser beams 20 detected in a single switch-on interval 31 of the sensor unit 12 were captured. The evaluation unit 22 processes, for example temporarily, in particular during the whole continuous operation state, the data as which the laser beams 20 detected in a single switch-on interval 31 of the sensor unit 12 were captured, in particular four data units, in each case completely, into four sensor signals 39.

The control unit 26 starts, for example temporarily, in particular during the whole continuous operation state, the switch-on intervals 31 of the sensor unit 12 and the switch-on intervals 43 of the evaluation unit 22 simultaneously. The control unit 26 starts, for example temporarily, in particular during the whole continuous operation state, the switch-off intervals 33 of the sensor unit 12 and the switch-off intervals 45 of the evaluation unit 22 simultaneously. The control unit 26 is configured, for example temporarily, in particular during the whole continuous operation state, to make the switch-on intervals 31 of the sensor unit 12 and the switch-on intervals 43 of the evaluation unit 22 follow each other with a maximum delay of 60 s. The control unit makes, for example temporarily, in particular during the whole continuous operation state, the switch-on intervals 31 of the sensor unit 12 and the switch-on intervals 43 of the evaluation unit 22 follow each other with a maximum delay of 60 s. The control unit 26 starts, for example temporarily, in particular during the whole continuous operation state, the switch-on intervals 31 of the sensor unit 12 and the switch-on intervals 43 of the evaluation unit 22 with a maximum delay of 60 s relative to each other. The control unit 26 starts, for example temporarily, in particular during the whole continuous operation state, the switch-off intervals 33 of the sensor unit 12 and the switch-off intervals 45 of the evaluation unit 22 with a maximum delay of 60 s relative to each other.

Figure 3:
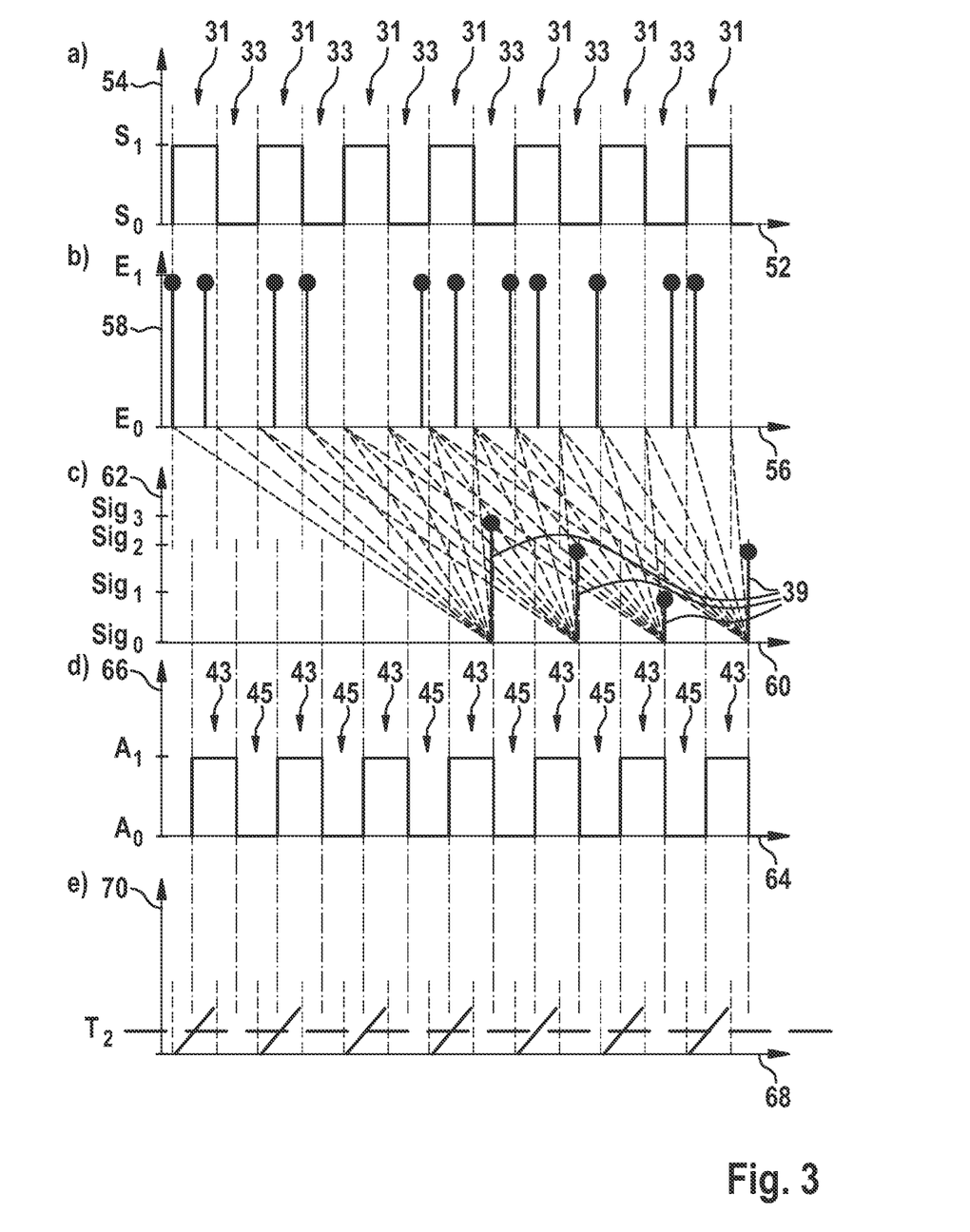

FIG. 3 shows further possible flow diagrams of the continuous operation state of the sensor device 10, in particular of the control unit 26. In particular, FIG. 3 may be understood as an exemplary timespan, in particular as a portion of the continuous operation state, of the continuous operation state of the sensor device 10, in particular of the control unit 26.

Diagram a) of FIG. 3 in particular shows a diagram with an abscissa 52, on which a time is plotted, and an ordinate 54, on which two switch states $S_0$ and $S_1$ of the sensor unit 12 are plotted analogously to diagram a) of FIG. 2.

Diagram b) of FIG. 3 in particular shows a diagram with an abscissa 56, which in particular corresponds to the abscissa 52, and an ordinate 58, on which events which are detectable by the detection unit 18 are plotted as event states $E_0$ and $E_1$ analogously to diagram b) of FIG. 2.

Diagram c) of FIG. 3 in particular shows a diagram with an abscissa 60, which in particular corresponds to the abscissa 52, and an ordinate 62, on which sensor signals 39 generated by the evaluation unit 22 are plotted as event states $Sig_0$, $Sig_1$, $Sig_2$ and $Sig_3$ analogously to diagram c) of FIG. 2.

Diagram d) of FIG. 3 in particular shows a diagram with an abscissa 64, which in particular corresponds to the abscissa 52, and an ordinate 66, on which two switch states $A_0$ and $A_1$ of the evaluation unit 22 are plotted analogously to diagram d) of FIG. 2.

Diagram e) of FIG. 3 in particular shows a diagram with an abscissa 68, which in particular corresponds to the abscissa 52, and an ordinate 70, on which a temperature of the sensor unit 12, in particular of the laser unit 14, is plotted analogously to diagram e) of FIG. 2.

The following description concerns the example of the continuous operation state shown in FIG. 3, wherein in particular the differences in regard to the example shown in FIG. 2 will be explained, and principally the general principles of the example of FIG. 2 shall also apply to the example of FIG. 3.

The control unit 26 is configured, in particular in the continuous operation state for example temporarily, in particular during the whole continuous operation state, to temporally offset the switch-on intervals 31 of the sensor unit 12 and the switch-on intervals 43 of the evaluation unit 22 at least partly.

The control unit 26 is configured, in the continuous operation state, for example temporarily, in particular during the whole continuous operation state, to start a first switch-on interval 31 of the sensor unit 12 before a first switch-on interval 43 of the evaluation unit 22. The control unit 26 starts, in the continuous operation state for example temporarily, in particular during the whole continuous operation state, a first switch-on interval 31 of the sensor unit 12 before a first switch-on interval 43 of the evaluation unit 22.

The control unit 26 offsets, in the continuous operation state for example temporarily, in particular during the whole continuous operation state, the switch-on intervals 31 of the sensor unit 12 and the switch-on intervals 43 of the evaluation unit 22 temporally by 40% of a duration of the switch-on interval 31 of the sensor unit 12, in particular of a duration of a switch-on interval 43 of the evaluation unit 22, which are in particular of the same length. The control unit 26 offsets, in the continuous operation state for example temporarily, in particular during the whole continuous operation state, the switch-on intervals 31 of the sensor unit 12 and the switch-on intervals 43 of the evaluation unit 22 temporally by less than 300% of a duration of the switch-on interval 31 of the sensor unit 12. The control unit 26 offsets, in the continuous operation state for example temporarily, in particular during the whole continuous operation state, the switch-on intervals 31 of the sensor unit 12 and the switch-on intervals 43 of the evaluation unit 22 temporally by less than 300% of a duration of the switch-on interval 43 of the evaluation unit 22.

The control unit 26 starts in the continuous operation state, for example temporarily, in particular during the whole continuous operation state, the switch-on intervals 31 of the sensor unit 12 and the switch-on intervals 43 of the evaluation unit 22 with a minimum delay of 0.1 s relative to each other. The control unit 26 starts in the continuous operation state, for example temporarily, in particular during the whole continuous operation state, the switch-off intervals 33 of the sensor unit 12 and the switch-off intervals 45 of the evaluation unit 22 with a minimum delay of 0.1 s relative to each other.

Diagram e) of FIG. 3 shows a temperature development of the laser unit 14 in the switch-on intervals 31 of the sensor unit 12. In particular, an average temperature $T_2$ is shown in diagram e) of FIG. 3. The average temperature $T_2$ is lower than the average temperature $T_1$ of the example shown in FIG. 2.

Figure 4:
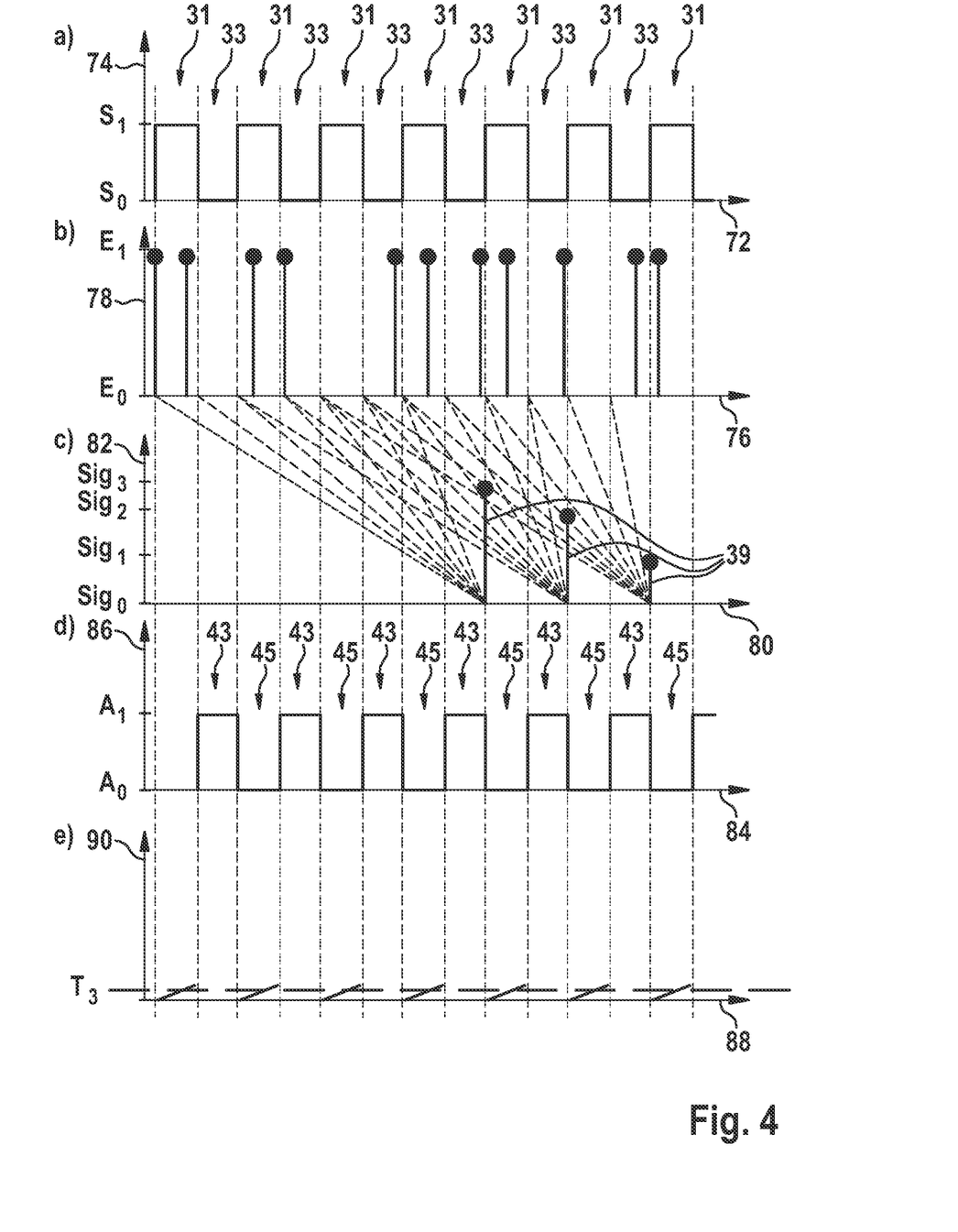

FIG. 4 shows further possible flow diagrams of the continuous operation state of the sensor device 10, in particular of the control unit 26. In particular, FIG. 4 may be understood as an exemplary timespan, in particular as a portion of the continuous operation state, of the continuous operation state of the sensor device 10, in particular of the control unit 26.

FIG. 4 differs from FIG. 3 only in that the switch-on intervals 31 of the sensor unit 12 are temporally fully offset from the switch-on intervals 43 of the evaluation unit 22.

Diagram a) of FIG. 4 in particular shows a diagram with an abscissa 72, on which a time is plotted, and an ordinate 74, on which two switch states $S_0$ and $S_1$ of the sensor unit 12 are plotted analogously to diagram a) of FIG. 3.

Diagram b) of FIG. 4 in particular shows a diagram with an abscissa 76, which in particular corresponds to the abscissa 72, and an ordinate 78, on which events which are detectable by the detection unit 18 are plotted as event states $E_0$ and $E_1$ analogously to diagram b) of FIG. 3.

Diagram c) of FIG. 4 in particular shows a diagram with an abscissa 80, which in particular corresponds to the abscissa 72, and an ordinate 82, on which sensor signals 39 generated by the evaluation unit 22 are plotted as event states $Sig_0$, $Sig_1$, $Sig_2$ and $Sig_3$ analogously to diagram c) of FIG. 3.

Diagram d) of FIG. 4 in particular shows a diagram with an abscissa 84, which in particular corresponds to the abscissa 72, and an ordinate 86, on which two switch states $A_0$ and $A_1$ of the evaluation unit 22 are plotted analogously to diagram d) of FIG. 3.

Diagram e) of FIG. 4 in particular shows a diagram with an abscissa 88, which in particular corresponds to the abscissa 72, and an ordinate 90, on which a temperature of the sensor unit 12, in particular the laser unit 14, is plotted analogously to diagram e) of FIG. 3.

The control unit 26 is configured, in particular in the continuous operation state, for example temporarily, in particular during the whole continuous operation state, to fully temporally offset the switch-on intervals 31 of the sensor unit 12 and the switch-on intervals 43 of the evaluation unit 22.

The control unit 26 offsets, in the continuous operation state for example temporarily, in particular during the whole continuous operation state, the switch-on intervals 31 of the sensor unit 12 and the switch-on intervals 43 of the evaluation unit 22 temporally by 100% of a duration of the switch-on interval 31 of the sensor unit 12, in particular of a duration of a switch-on interval 43 of the evaluation unit 22, which are in particular of the same length.

In the continuous operation state, for example temporarily, in particular during the whole continuous operation state, the control unit 26 makes the switch-on intervals 31 of the sensor unit 12 and the switch-on intervals 43 of the evaluation unit 22 follow each other without delay.

Diagram e) of FIG. 4 shows a temperature development of the laser unit 14 in the switch-on intervals 31 of the sensor unit 12. In particular, an average temperature $T_3$ is shown in diagram e) of FIG. 4. The average temperature $T_3$ is lower than the average temperature $T_1$ of the example shown in FIG. 2 and lower than the average temperature $T_2$ of the example shown in FIG. 3, in particular due to a smaller heat transfer from the evaluation unit 22 to the sensor unit 12.

Figure 5:
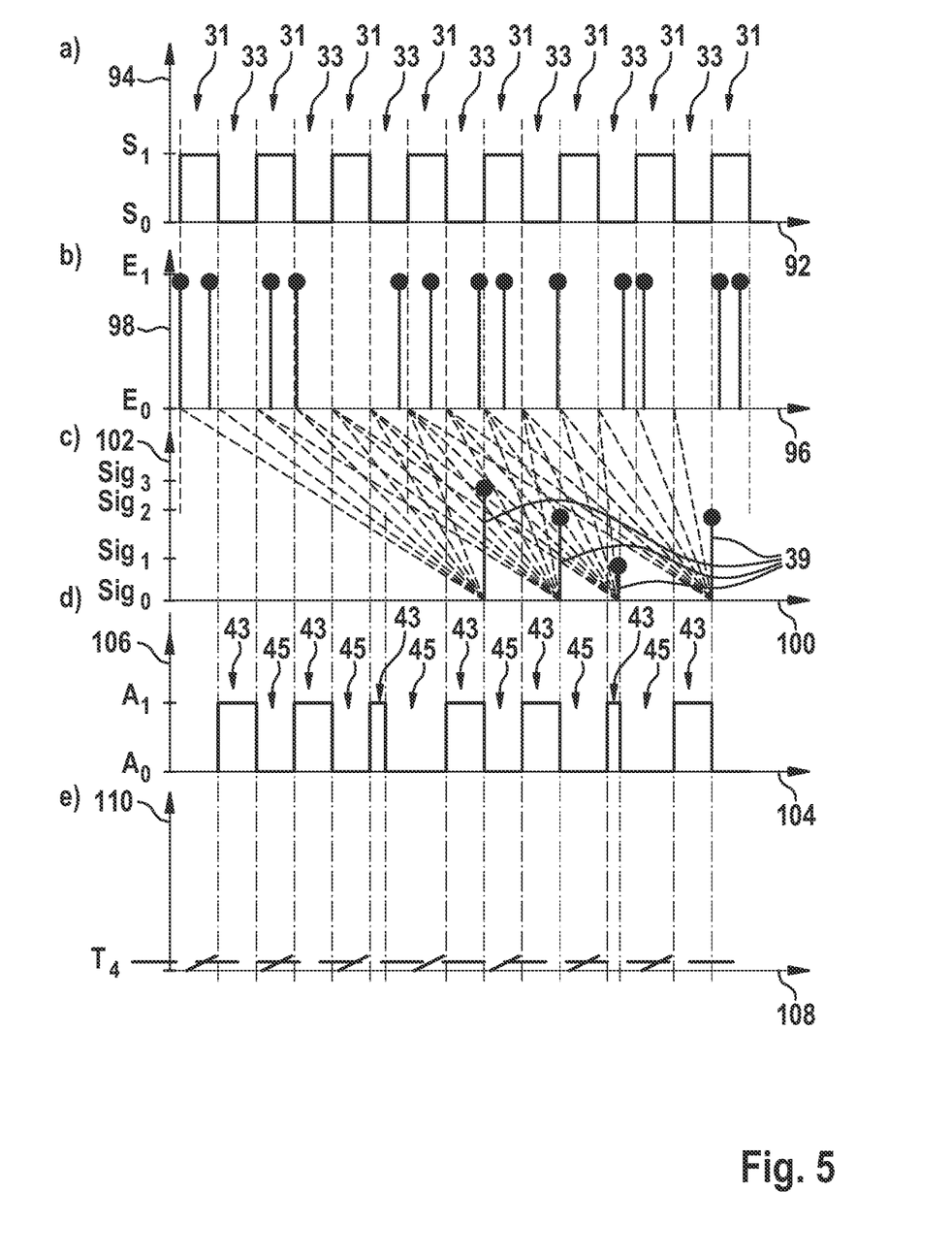

FIG. 5 shows further possible flow diagrams of the continuous operation state of the sensor device 10, in particular of the control unit 26. In particular, FIG. 5 may be understood as an exemplary timespan, in particular as a portion of the continuous operation state, of the continuous operation state of the sensor device 10, in particular of the control unit 26.

FIG. 5 differs from FIG. 4 only in that the switch-on intervals 31 of the sensor unit 12 are temporally variable.

Diagram a) of FIG. 5 in particular shows a diagram with an abscissa 92, on which a time is plotted, and an ordinate 94, on which two switch states $S_0$ and $S_1$ of the sensor unit 12 are plotted analogously to diagram a) of FIG. 2.

Diagram b) of FIG. 5 in particular shows a diagram with an abscissa 96, which in particular corresponds to the abscissa 92, and an ordinate 98, on which events which are detectable by the detection unit 18 are plotted as event states $E_0$ and $E_1$ analogously to diagram b) of FIG. 2.

Diagram c) of FIG. 5 in particular shows a diagram with an abscissa 100, which in particular corresponds to the abscissa 92, and an ordinate 102, on which sensor signals 39 generated by the evaluation unit 22 are plotted as event states $Sig_0$, $Sig_1$, $Sig_2$ and $Sig_3$ analogously to diagram c) of FIG. 2.

Diagram d) of FIG. 5 in particular shows a diagram with an abscissa 104, which in particular corresponds to the abscissa 92, and an ordinate 106, on which two switch states $A_0$ and $A_1$ of the evaluation unit 22 are plotted analogously to diagram d) of FIG. 2.

Diagram e) of FIG. 5 in particular shows a diagram with an abscissa 108, which in particular corresponds to the abscissa 92, and an ordinate 110, on which a temperature of the sensor unit 12, in particular of the laser unit 14, is plotted analogously to diagram e) of FIG. 2.

The control unit 26 is configured, in particular in the continuous operation state, for example temporarily, in particular during the whole continuous operation state, to vary a duration of the switch-on intervals 43 of the evaluation unit 22, in particular depending on laser beams 20, in particular depending on a number of laser beams 20, detected by the sensor unit 12.

The control unit 26 is configured, in particular in the continuous operation state, for example temporarily, in particular during the whole continuous operation state, to vary the duration of the switch-on intervals 43 of the evaluation unit 22 between maximally 5 s and minimally 0.1 s, in particular depending on laser beams 20 detected by the sensor unit 12.

The control unit 26 is configured, in particular in the continuous operation state, for example temporarily, in particular during the whole continuous operation state, to shorten the duration of the switch-on intervals 43 of the evaluation unit 22 if few laser beams 20 have been detected by the sensor unit 12, in particular in order to no longer operate the evaluation unit 22 for a generation of the sensor signal 39.

The control unit 26 is configured, in particular in the continuous operation state, for example temporarily, to make switch-on intervals 31, in particular a fourth and a seventh switch-on interval 31 of FIG. 5, of the sensor unit 12 follow switch-on intervals 43, in particular a third and a sixth switch-on interval of FIG. 5, of the evaluation unit 22 with a delay that is in particular at least 0.01 s.

Diagram e) of FIG. 5 shows a temperature development of the laser unit 14 in the switch-on intervals 31 of the sensor unit 12. In particular, an average temperature $T_4$ is shown in diagram e) of FIG. 5. The average temperature $T_4$ is lower than the average temperature $T_1$ of the example shown in FIG. 2, than the average temperature $T_2$ of the example shown in FIG. 3 and than the average temperature $T_3$ of the example shown in FIG. 4, in particular due to an even smaller heat transfer from the evaluation unit 22 to the sensor unit 12.

Figure 6:
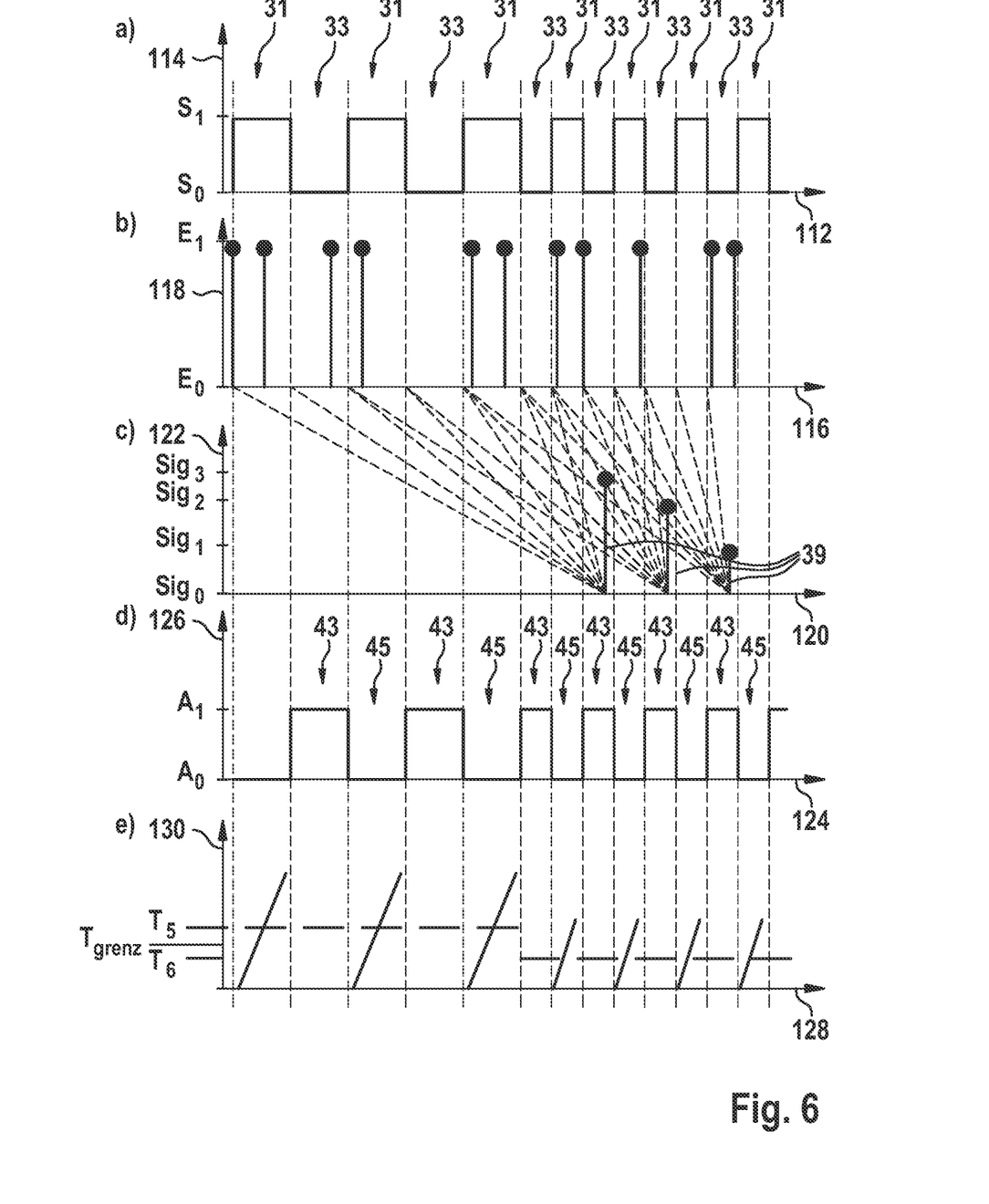

FIG. 6 shows further possible flow diagrams of the continuous operation state of the sensor device 10, in particular of the control unit 26. In particular, FIG. 6 may be understood as an exemplary timespan, in particular as a portion of the continuous operation state, of the continuous operation state of the sensor device 10, in particular of the control unit 26.

FIG. 6 differs from FIG. 5 in that the switch-on intervals 31 of the sensor unit 12 are temporally variable depending on a temperature of the evaluation unit 22 and of the sensor unit 12.

Diagram a) of FIG. 6 in particular shows a diagram with an abscissa 112, on which a time is plotted, and an ordinate 114, on which two switch states $S_0$ and $S_1$ of the sensor unit 12 are plotted analogously to diagram a) of FIG. 2.

Diagram b) of FIG. 6 in particular shows a diagram with an abscissa 116, which in particular corresponds to the abscissa 112, and an ordinate 118, on which events which are detectable by the detection unit 18 are plotted as event states $E_0$ and $E_1$ analogously to diagram b) of FIG. 2.

Diagram c) of FIG. 6 in particular shows a diagram with an abscissa 120, which in particular corresponds to the abscissa 112, and an ordinate 122, on which sensor signals 39 generated by the evaluation unit 22 are plotted as event states $Sig_0$, $Sig_1$, $Sig_2$ and $Sig_3$ analogously to diagram c) of FIG. 2.

Diagram d) of FIG. 6 in particular shows a diagram with an abscissa 124, which in particular corresponds to the abscissa 112, and an ordinate 126, on which two switch states $A_0$ and $A_1$ of the evaluation unit 22 are plotted analogously to diagram d) of FIG. 2.

Diagram e) of FIG. 6 in particular shows a diagram with an abscissa 128, which in particular corresponds to the abscissa 112, and an ordinate 130, on which a temperature of the sensor unit 12, in particular of the laser unit 14, is plotted analogously to diagram e) of FIG. 2.

The control unit 26 is configured, in particular in the continuous operation state, for example temporarily, in particular during the whole continuous operation state, to vary a duration of the switch-on intervals 43 of the evaluation unit 22 and a duration of the switch-off intervals 45 of the evaluation unit 22 depending on a temperature of the sensor unit 12.

Analogously the control unit 26 could alternatively be configured, in particular in the continuous operation state, for example temporarily, in particular during the whole continuous operation state, to vary a duration of the switch-on intervals 31 of the sensor unit 12 and a duration of the switch-off intervals 33 of the sensor unit 12, in particular depending on a temperature of the evaluation unit 22 or of the sensor unit 12.

Diagram e) of FIG. 5 shows a temperature development of the laser unit 14 in the switch-on intervals 31 of the sensor unit 12. In particular, in diagram e) of FIG. 5 an average temperature $T_5$ is shown for three first switch-on intervals 31 of the sensor unit 12. In diagram e) of FIG. 5, in particular an average temperature $T_6$ is shown for four switch-on intervals 31 of the sensor unit 12 following the first three switch-on intervals 31.

The average temperature $T_5$ is higher than a limit temperature $T_{grenz}$. The average temperature $T_6$ is lower than the limit temperature $T_{grenz}$.

The control unit 26 is configured, in particular in the continuous operation state, for example temporarily, in particular during the whole continuous operation state, to vary a duration of the switch-on intervals 43 of the evaluation unit 22 and a duration of the switch-off intervals 45 of the valuation unit 22 depending on the temperature of the sensor unit 12.

The control unit 26 is configured, in particular in the continuous operation state, for example temporarily, in particular during the whole continuous operation state, to shorten a duration of the switch-on intervals 43 of the evaluation unit 22 above the limit temperature $T_{grenz}$ of the sensor unit 12.

| | Reference numerals | |
|---|---|---|
| 10 | Sensorvorrichtung | sensor device |
| 12 | Sensoreinheit | sensor unit |
| 14 | Lasereinheit | laser unit |
| 15 | Laserelement | laser element |
| 16 | Laserstrahl | laser beam |
| 18 | Detektionseinheit | detection unit |
| 19 | Detektionselement | detection element |
| 20 | Laserstrahl | laser beam |
| 22 | Auswerteeinheit | evaluation unit |
| 24 | Auswerteelement | evaluation element |
| 25 | Recheneinheit | computing unit |
| 26 | Kontrolleinheit | control unit |
| 28 | Temperatursensor | temperature sensor |
| 30 | Abszisse | abscissa |
| 31 | Einschaltintervall | switch-on interval |
| 32 | Ordinate | ordinate |
| 33 | Ausschaltintervall | switch-off interval |
| 34 | Abszisse | abscissa |
| 36 | Ordinate | ordinate |
| 38 | Abszisse | abscissa |
| 39 | Sensorsignal | sensor signal |
| 40 | Ordinate | ordinate |
| 42 | Abszisse | abscissa |
| 43 | Einschaltintervall | switch-on interval |
| 44 | Ordinate | ordinate |
| 45 | Ausschaltintervall | switch-off interval |
| 46 | Abszisse | abscissa |
| 48 | Ordinate | ordinate |
| 50 | Partikelsensor | particulate matter sensor |
| 52 | Abszisse | abscissa |
| 54 | Ordinate | ordinate |
| 56 | Abszisse | abscissa |
| 58 | Ordinate | ordinate |
| 60 | Abszisse | abscissa |
| 62 | Ordinate | ordinate |
| 64 | Abszisse | abscissa |
| 66 | Ordinate | ordinate |
| 68 | Abszisse | abscissa |
| 70 | Ordinate | ordinate |
| 72 | Abszisse | abscissa |
| 74 | Ordinate | ordinate |
| 76 | Abszisse | abscissa |
| 78 | Ordinate | ordinate |
| 80 | Abszisse | abscissa |
| 82 | Ordinate | ordinate |
| 84 | Abszisse | abscissa |
| 86 | Ordinate | ordinate |
| 88 | Abszisse | abscissa |
| 90 | Ordinate | ordinate |
| 92 | Abszisse | abscissa |
| 94 | Ordinate | ordinate |
| 96 | Abszisse | abscissa |
| 98 | Ordinate | ordinate |

-continued

| Reference numerals | | |
|---|---|---|
| 100 | Abszisse | abscissa |
| 102 | Ordinate | ordinate |
| 104 | Abszisse | abscissa |
| 106 | Ordinate | ordinate |
| 108 | Abszisse | abscissa |
| 110 | Ordinate | ordinate |
| 112 | Abszisse | abscissa |
| 114 | Ordinate | ordinate |
| 116 | Abszisse | abscissa |
| 118 | Ordinate | ordinate |
| 120 | Abszisse | abscissa |
| 122 | Ordinate | ordinate |
| 124 | Abszisse | abscissa |
| 126 | Ordinate | ordinate |
| 128 | Abszisse | abscissa |
| 130 | Ordinate | ordinate |

The invention claimed is:

1. A particulate matter sensor having a sensor device comprising
    at least one sensor unit comprising at least one laser unit for a generation of at least one laser beam and comprising at least one photodetector for a detection of laser beams,
    a switch element which is configured to process detected laser beams into sensor signals,
    a control unit which is configured, in a continuous operation state, to
        actuate the sensor unit and the switch element for an operation of the sensor unit and the switch element in alternating switch-on intervals and switch-off intervals,
        limit the switch-on intervals of the sensor unit and the switch-on intervals of the switch element to a duration of maximally 60 s,
        limit the switch-on intervals of the sensor unit and the switch-on intervals of the evaluation unit all to a same duration, and
        limit the switch-off intervals of the sensor unit and the switch-off intervals of the switch element all to a same duration,
    wherein the switch element is configured to generate in the switch-on intervals the sensor signals as moving averages from data, which were captured and stored by the photodetector in the last four different switch-on intervals of the sensor unit,
    and wherein in the switch-on intervals of the switch element, the switch element generates sensor signals from the fourth switch-on interval of the switch element on, with the first three sensor signals being implemented as zero signals when a minimum number of four switch-on intervals of the sensor unit have not been gone through yet.

2. The sensor device according to claim 1, wherein the switch element is configured to generate at least two sensor signals from laser beams detected in a switch-on interval of the sensor unit.

3. The sensor device according to claim 1, wherein the switch element is configured to generate different sensor signals at a maximum temporal distance of 60 s to each other.

4. The sensor device according to claim 1, wherein the at least two switch-on intervals of the sensor unit together have a duration that depends on laser beams detected by the sensor unit.

* * * * *